FIG. 1

INVENTORS
REUEL W. BENNETT
PHILIP L. SALVATORI
CHESTER J. BLACK
ATTORNEY

FIG. 3

INVENTORS
REUEL W. BENNETT
PHILIP L. SALVATORI
CHESTER J. BLACK

BY
ATTORNEY

FIG. 6

INVENTORS
REUEL W. BENNETT
PHILIP L. SALVATORI
CHESTER J. BLACK
BY Richard Rawling
ATTORNEY

Oct. 8, 1968    R. W. BENNETT ET AL    3,404,936
OPHTHALMOMETER AND METHOD OF MEASURING CURVATURE OF A CORNEA
Filed Oct. 1, 1964    10 Sheets-Sheet 9

INVENTORS
REUEL W. BENNETT
PHILIP L. SALVATORI
CHESTER J. BLACK
BY
ATTORNEY

United States Patent Office 3,404,936
Patented Oct. 8, 1968

3,404,936
OPHTHALMOMETER AND METHOD OF MEASURING CURVATURE OF A CORNEA
Reuel W. Bennett, Bradenton, and Philip L. Salvatori, Sarasota, Fla., and Chester J. Black, Elmhurst, Ill., assignors to Obrig Laboratories, Inc., Sarasota, Fla., a corporation of New York
Filed Oct. 1, 1964, Ser. No. 400,770
18 Claims. (Cl. 351—6)

ABSTRACT OF THE DISCLOSURE

An ophthalmometer with an improved mire system and a telescope for superimposing at the eye of an operator reflected mire images from the eye of a patient with extreme accuracy, together with an improved mounting structure for the telescope of the ophthalmometer by which the telescope may be adjustably positioned about an optical axis of the telescope in alignment with the eye of the patient at such adjusted positions that measurement of the curvature of a cornea of the eye of the patient may be effected for the more accurate design and fitting of a contact lens to the eye of a patient.

---

This invention relates to an improved ophthalmometer for use in the study and measurement of the topography of the cornea to effect the more accurate design and fitting of a contact lens to the eye of a patient, and more particularly to an improved mounting structure for a telescope of an ophthalmometer in which the telescope may be angularly positioned about the eye of a patient in a supporting ring and arcuate structure so that measurement of the cornea of the eye may be taken at any axis and at preselected angular degrees away from a point corresponding to the central point of fixation of the eye of the patient.

An object of the invention is to provide an ophthalmometer which may be angularly positioned with greater accuracy in front of the eye of a patient while the eye is directed at a point of fixation which may be called the primary line of sight.

Heretofore instruments have been provided for measuring the peripheral areas of the cornea in which the measuring instrument has been held stationary while the eye is moved away from the original line of fixation. In distinction an object of the present invention is to provide a novel mounting means for an ophthalmometer in which the ophthalmometer may be angularly positioned about the eye in a first arcuate member supported by an annular member rotatably mounted in a second arcuate supporting member so that measurements of the peripheral areas of the cornea may be made by the ophthalmometer at any axis and at varying degrees away from the central point of fixation of the eye.

Another object of the invention is the provision of an improved mire system for a telescope of an ophthalmometer so arranged that the size of the image reflected from the cornea of the eye of the patient may be made extremely small and in the form of a triangular image of less than one millimeter in length and an image size much smaller than that heretofore provided due to an improved arrangement in which the images or targets are projected much nearer one to the other onto the surface of the cornea of the eye of the patient than heretofore so that in the provision of the minute reflected triangular image the operator of the present improved ophthalmometer may be able to take many more measurements over the surface of the cornea of the eye of the patient than was heretofore possible with the prior type ophthalmometer and the operator may therefore more accurately plot those measurements as they are related one with the other or related to each other.

In comparison to the small size of the reflected image possible with the present improved ophthalmometer, the size of the reflected image possible with the prior type ophthalmometer would be from two and a half to four times this size so that if the measurements of the prior type ophthalmometer were put end to end as the measurements progressed from the center to the periphery of the cornea of the eye only two or three measurements would be possible.

Furthermore not only was the reflected image in the case of the prior type ophthalmometer much larger, but the images or targets were projected much farther apart onto the surface of the cornea of the eye so that the measurements which exist between the reflected images of the mires or targets was not determinable with extreme accuracy.

Moreover while with the prior type ophthalmometer three or four measurements of the topography of the cornea of the eye may have been previously obtainable from the center to the periphery of the cornea, it has been found that with the improved type ophthalmometer of the present invention there may be obtained seven to eight or even more measurements of the cornea surface in such area. As the operator progresses in measuring the cornea surface from the temporal to the nasal side, in many cases it is possible for the operator through use of the present improved ophthalmometer to take from ten to fifteen measurement readings without overlapping. Further in the taking of peripheral readings it has been found that with the smaller reflected image size of a length of less than one millimeter provided by the present invention, the operator has been able to take measurement readings further out on the periphery of the cornea of the eye of the patient.

Another object of the invention is to provide an improved ophthalmometer mounting structure in which a telescope may be adjusted by the operator so as to follow the axis of the astigmatism of the eye of the patient at any point away from the primary line of sight.

It has been found that if the true axis measurement reading is not taken the ophthalmometer may indicate or record a finding that the cornea surface is much flatter than is actually the case. Moreover as the measurement readings are taken a few degrees away from the central point of fixation the axis may change to one slightly oblique to the finding for the original central point of fixation.

Another object of the invention therefore is to provide an improved phthalmometer which may be adjusted by the operator so as to follow the true axis of this astigmatism at any measurable degree away from the central point of fixation.

Furthermore the action of the external muscles may create a false cornea astigmia and muscular imbalances are frequently associated with a relative amount of corneal astigmatia. The combined pull and counter-pull of the external muscles may result in a flattening of the cornea along the horizontal meridian. Thus in taking a series of measurements or readings of a cornea that seems to vary in power the examiner should be aware of the muscular tension, and the changes of muscular tension that may permit the cornea to change in its form.

Going a step further, the examiner needs to be aware of the action of cyclophoria as it is quite capable of throwing off the axis of the astigmatism of the eye as the patient goes through the visual act of looking from a distance point to a near point.

Another object of the invention therefore is to provide a fixation target so designed and arranged in such a way as to cause the least amount of stimulance to its desire for accommodation. It has been found that the use of a small fixation light is desirable as the patient cannot judge its distance and is less apt to exert accommodating conversion efforts during the examination.

Likewise as the patient turns his eyes away from the primary line of fixation the lid pressure may vary in such a way as to effect the reading of the radius of curvatures. There are patients with very tight lids and very spastic muscles. Squinting as related to photophobia is also a factor in creating unreliable findings. Over-illumination within the target system will aggravate the photophobia and bring on a natural squinting.

The effects of the extrensic muscles, the effects of accommodation, the effects of cyclotortion, the effects of photophobia, the effects of lid pressure have all been taken into consideration in the structural arrangement of the ophthalmometer embodying the present invention. These effects may be ever so small, but they must be taken into consideration in the accurate study of the human eye.

Therefore another object of the invention is to provide an improved mounting means for the telescope of the ophthalmometer whereby the examiner may accurately follow the astigmatism in all measurable areas while the patient maintains a line of fixation at the primary line of sight.

The above and other objects and advantages of the present invention will appear more fully hereinafter from a consideration of the detailed description which follows, taken together with the accompanying drawings wherein the features of the present invention are illustrated. It is to be expressly understood, however, that the drawings are for the purpose of illustration only and are not designed as a definition of the limits of the invention.

In the drawings wherein like reference characters refer to like parts throughout the several views.

Figure 3:
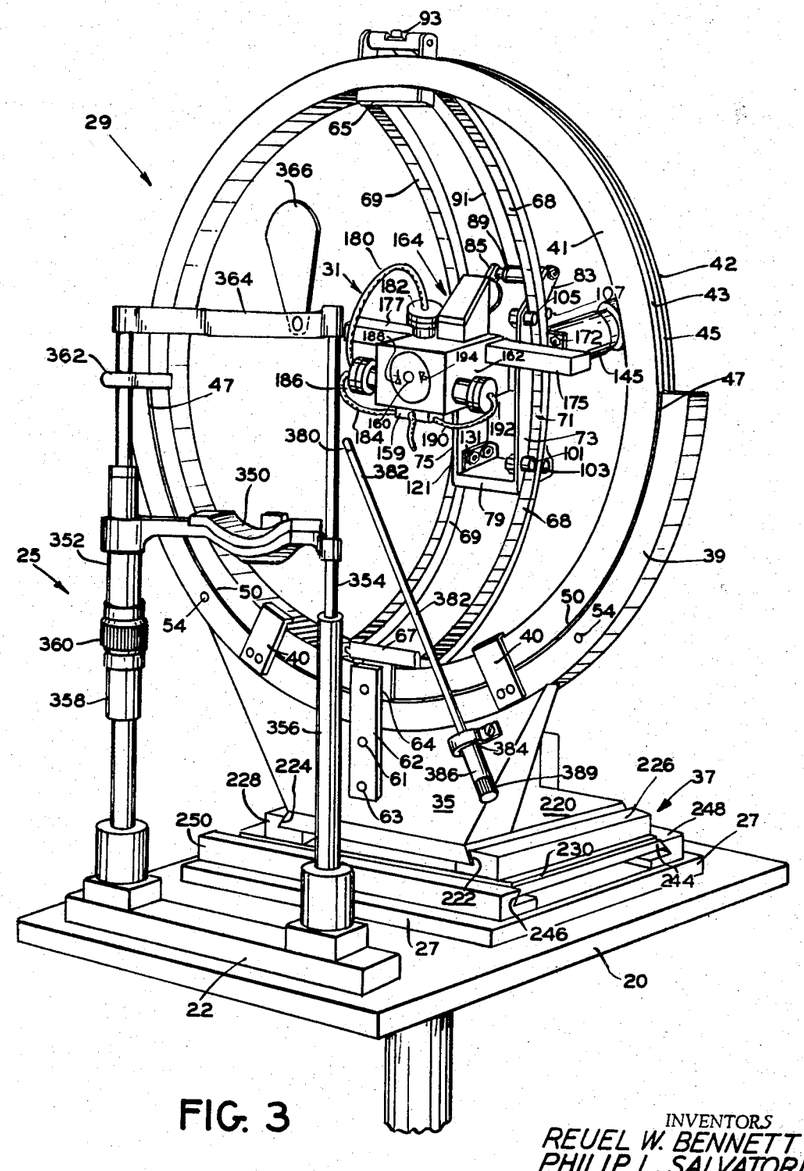
FIGURE 3 is a perspective view of the ophthalmometer shown in FIGURE 1, shown in cooperative relation with a chin rest for the patient and taken from a point of view in rear of, slightly below, and slightly to the right of the head of the patient were one sitting with his head in a proper position in the chin rest in preparation for the measurement of the topography of the cornea of the patient's eye.

Referring to the drawing of FIGURE 3, there is indicated by the numeral 20 a base or table to which there is affixed a mounting plate 22 of a chin rest or head support, which is indicated generally by the numeral 25. There is further affixed to the table 20 a second mounting plate 27 for an ophthalmometer, which is indicated generally by the numeral 29, and embodying the present invention.

As shown in FIGURE 3, the ophthalmometer 29 is positioned in spaced relation to the chin rest 25 in an arrangement in which the patient, whose eyes are to be examined, would be seated at the near side of the table 20 with his chin supported in the chin rest 25 and facing the ophthalmometer 29 while the operator or eye examiner would be seated at the far side of the table 20 facing in an opposite direction from that of the patient so as to view, through a telescopic device 31 carried by the ophthalmometer 29, the cornea of the eye of the patient under examination.

The ophthalmometer 29, as viewed from the operator's side of the table 20, is shown in detail in FIGURE 1 and includes a pedestal 35 longitudinally and laterally adjustable in relation to the mounting plate 27 by an operator-operative adjustment mechanism, which is indicated generally by the numeral 37, and shown in detail in FIGURES 1, 2, 3 and 9, as hereinafter explained.

*Adjustable ring mounting*

Carried by the pedestal 35 and affixed thereto is an arcuate ring support 39 having a pair of flange members 40 secured thereto. The flange members 40 have bent over end portions to slidably mount therein for angular adjustment a rotatable ring 41 as best shown in FIGURE 3. The ring 41 has annular flange portions 42 and 43 and an intermediate annular groove 45 in which are slidably mounted ring guides 47 pinned at 49 to the arcuate ring support 39, as best shown in FIGURE 4.

Figure 1:
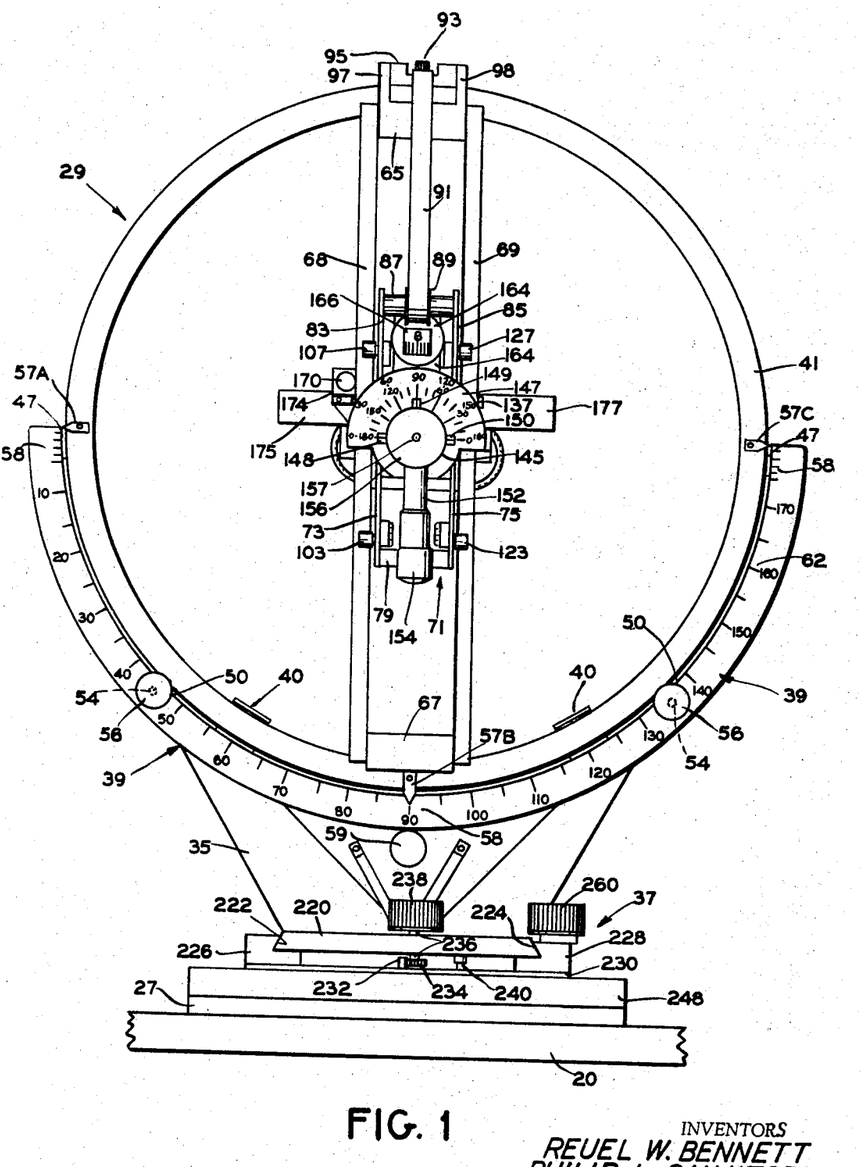
FIGURE 1 is a view of an ophthalmometer embodying the invention and taken from the position of the operator or eye examiner.
Figure 2:
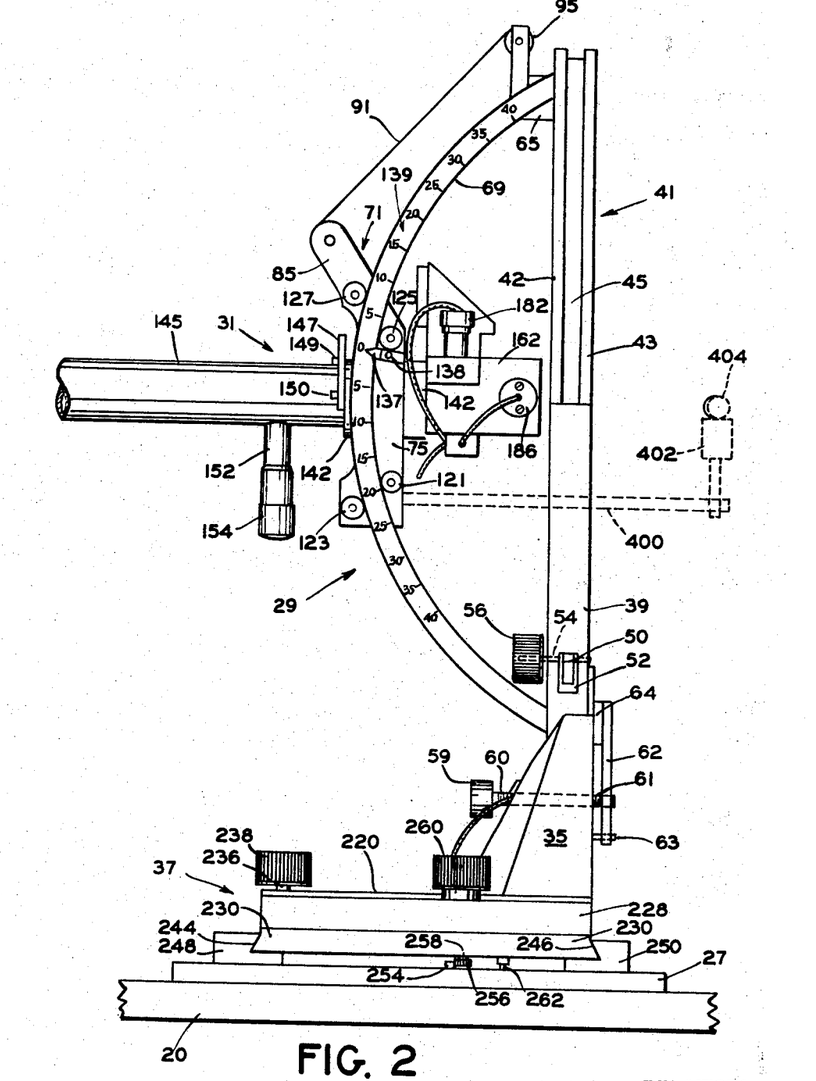
FIGURE 2 is a side view of the ophthalmometer shown in FIGURE 1.
Figures 4, 5:
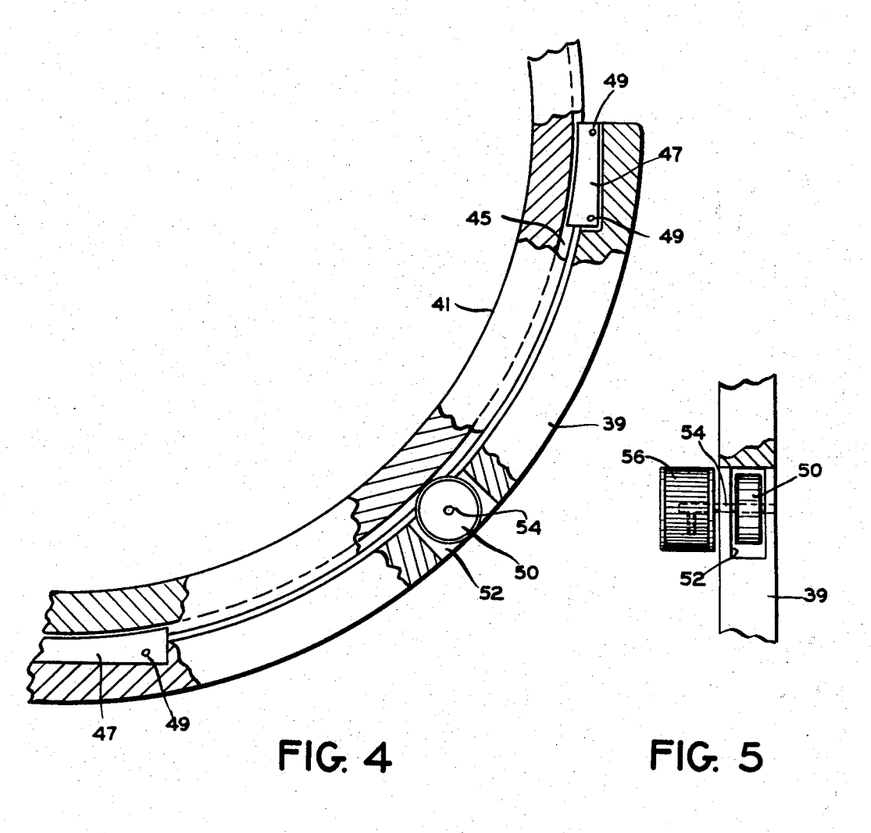
FIGURE 4 is an enlarged fragmentary view of the ring structure of FIGURES 1, 2 and 3 with certain portions broken away to better illustrate the rubber covered rollers and ring guides whereby angular adjustment of an inner ring relative to an outer arcuate supporting member may be effected so as to position the telescope of the ophthalmometer about an axis corresponding to the central point of fixation of the eye of the patient.
FIGURE 5 is an enlarged fragmentary view of a portion of the outer arcuate supporting member of FIGURES 2 and 4, illustrating the operative relation between the rubber covered roller and an operator-operative adjustment knob to effect a fine adjustment of the inner ring relative to the outer arcuate supporting member.

A pair of rubber coated rollers 50, one of which is shown in FIGURES 2, 4 and 5, are also carried by the ring support 39 and frictionally engage in the annular groove 45 of the ring 41. As shown in FIGURES 2, 4 and 5, each of the rollers 50 are positioned in a slot 52 provided in the ring support 39 and rotatably mounted therein by a dowel pin 54 to which there is affixed an adjustment knob 56 mounted at the operator's side of the ophthalmometer 29. Further, as best shown in FIGURE 1, there is an adjustment knob 56 provided on the ring support 39 at each side of the pedestal 35 so that the operator may effect a vernier adjustment of the knobs 56 with both hands to angularly adjust the ring 41 in the ring support 39 with extreme accuracy.

Pointers 57A, 57B and 57C are carried by the ring 41 and arranged ninety degrees apart in a cooperative relation with suitable scale graduations 58 provided on the operator's side of the ring support 39 so that the operator may readily determine therefrom the angular adjusted position of the ring 41.

In order to secure the ring 41 in an adjusted position, there is provided a releasable locking mechanism including an operator-operative knob 59, shown in FIGURES 1 and 2, which is connected to one end of a shaft 60 which extends through the pedestal 35. The opposite end 61 of the shaft 60 is screw threadedly engaged in a brake member 62. One end of the brake member 62 is slidably engaged by a pin 63, which projects from the pedestal 35 while the opposite end of the member 62 has affixed thereto a brake shoe 64 which bears upon an outer surface of the ring 41 so as to secure it in an adjusted position upon the operator turning the knob 59 so as to draw the brake member 62 toward the pedestal 35 on the screw threaded end 61, as best shown in FIGURE 3.

*Adjustable carriage and arcuate rail mounting*

Further secured to the ring 41 by mounting plates 65 and 67 are opposite ends of a pair of arcuate rails 69 and 69 on which is slidably mounted a carriage 71 for the telescopic device 31. The carriage 71 is shown in detail in FIGURES 6 and 8, and includes a pair of side members 73 and 75 fastened at one end by bolts 77 to a base plate 79 while at the opposite ends of the side members 73 and 75 there project ears 83 and 85, respectively, between which there is mounted a shaft 87 carrying a drum 89. There is affixed to the drum 89 one end of a ribbon spring 91. A portion of the ribbon spring 91 is wound about the drum 89, which may be spring biased by suitable spring means, not shown, while the opposite end of the ribbon spring 91 is fastened by a bolt 93 to a rod 95 mounted between two ears 97 and 98 projecting from the mounting plate 65. This arrangement secures the upper ends of the arcuate rails 68 and 69 to the ring 41, as best shown in FIGURE 1. The ribbon spring 91 applies a suitable biasing force on the carriage 71, tending to balance the opposing gravitational forces acting on the carriage 71 and the telescope 31 mounted therein so that as the carriage 71 is moved along the arcuate rails 68 and 69, the ribbon spring 91 is wound on or off of the balance spring drum 89 as the carriage is moved by the operator along arcuate rails 68 and 69.

Figure 6:
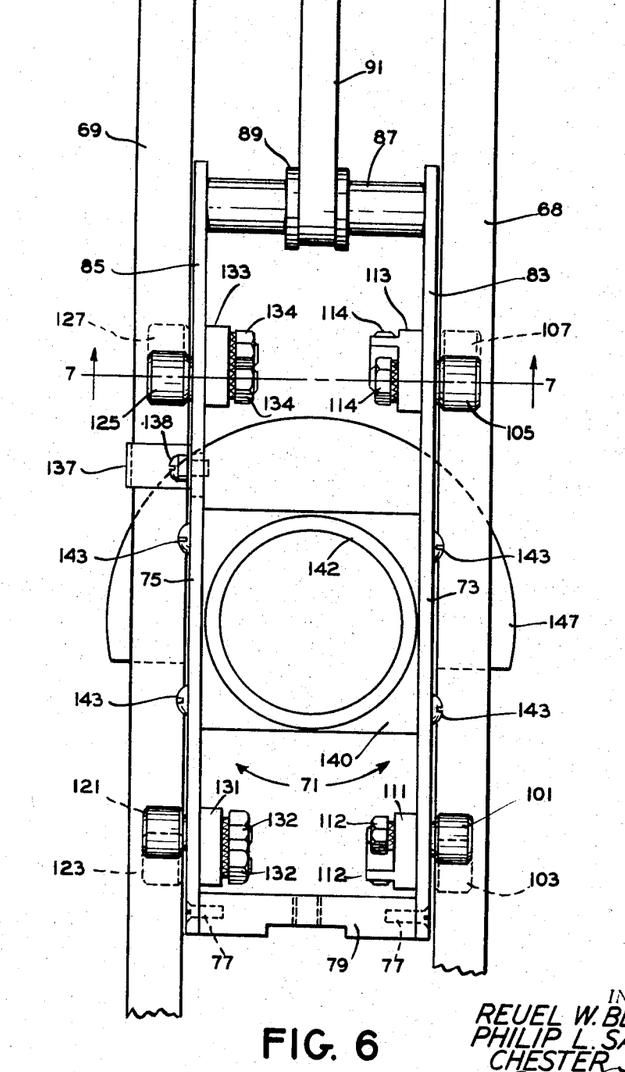
FIGURE 6 is an enlarged fragmentary view of the mount for the telescope of the ophthalmometer and curved trackway for carrying the telescope mount.
Figures 7, 8:
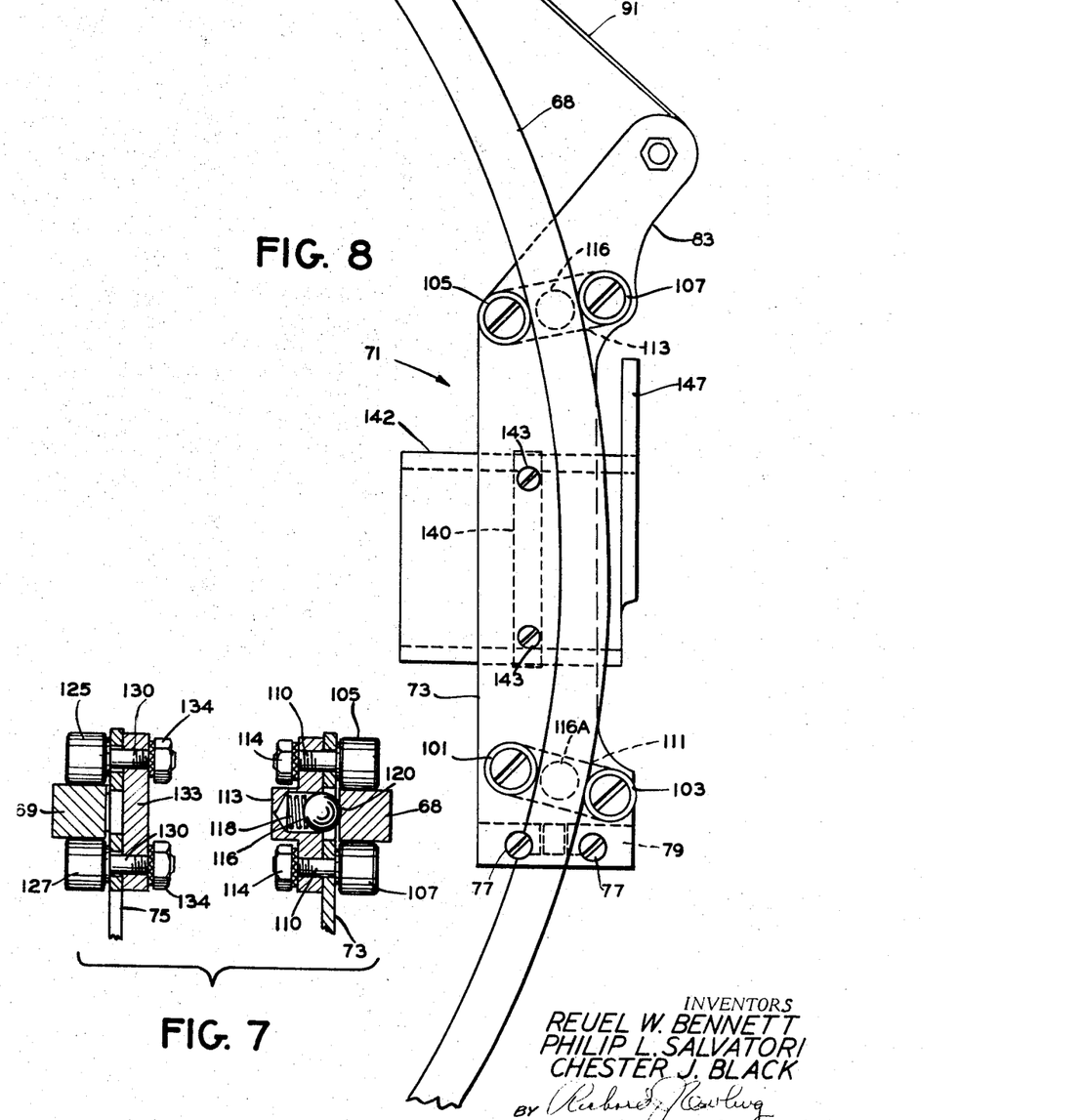
FIGURE 7 is a fragmentary sectional view of FIGURE 6, the same being taken along the lines 7—7 of FIGURE 6, looking in the direction of the arrows.
FIGURE 8 is a side view of a fragmentary portion of the telescope mount and curved trackway of FIGURE 6.

As shown by FIGURES 6, 7 and 8, there projects from the carriage side member 73 a pair of antifriction rollers 101 and 103 at the lower end and a second pair of antifriction rollers 105 and 107 at the upper end of the side member 73 arranged in cooperative relation with the inner and outer peripheral surfaces of the arcuate rail 68.

The rollers 101, 103, 105 and 107 are rotatably mounted on suitable bolts 110. The mounting bolts 110 for the rollers 101 and 103 project through suitable holes provided in a lower end portion of the side member 73 and are fastened at the opposite side thereof in a mounting bracket 111 by fastening nuts 112.

The mounting bolts 110 for the rollers 105 and 107 project through suitable holes in an upper portion of the side member 73 and are fastened at the opposite side of the member 73 from the rollers 105 and 107 in a mounting bracket 113 by fastening nuts 114.

The mountnig bracket 113 is of an identical construction to the bracket 111, and each includes therein a detent ball 116 and 116A, respectively. As shown in FIGURE 7, the ball 116 is biased by a spring 118 into selective engagement in suitable detents 120 provided in the adjacent inner surface of the arcuate rai l68 so as to releasably lock the carriage 71 in an adjusted arcuate position thereon. The other ball 116A is positioned in the bracket 111 and biased by a spring similiar to the spring 118 so as to provide a like function in the detents 120, and is shown by dotted lines in FIGURE 8.

Further, as shown in FIGURES 6, 7 and 8, there projects from the carriage 71 side member 75 a pair of antifriction rollers 121 and 123 at the lower end and a second pair of antifriction rollers 125 and 127 at the upper end of the side member 75 arranged in cooperatvie relation with the inner and outer peripheral surfaces of the arcuate rail 69.

The rollers 121, 123, 125 and 127 are rotatably mounted on suitable bolts 130. The mounting bolts 130 for the rollers 121 and 123 project through suitable holes provided in a lower end portion of the side member 75 and are fastened at the opposite side thereof in a mounting bracket 131 by fastening nuts 132.

The mounting bolts 130 for the rollers 125 and 127 project through suitable holes in an upper portion of the side member 75 and are fastened at the opposite side of the member 75 from the rollers 125 and 127 in a mounting bracket 133 by fastening nuts 134. The mounting bracket 133 is of identical construction to the mounting bracket 133 is of identical construction to the mounting bracket 131 and is shown in operative relation to the mounting bolts 130 of the rollers 125 and 127 in FIGURE 7.

Thus, as shown in FIGURES 1, 2, 3 and 6, the carriage 71 is movably mounted on the trackway formed by the arcuate rails 68 and 69 by the antifriction rollers 101–103, 105–107, 121–123 and 125–127. An indicator pointer 137 is affixed to the side member 75 of the carriage 71 by a suitable bolt 138 and arranged in cooperative relation with suitable indicia 139 provided on the outer surface of the arcuate rail 69 so as to indicate the angular adjusted position of the telescopic device 31 borne by the carriage 71 relative to the horizontal plane as shown by FIGURE 3.

*Carriage mounting for telescopic device*

Referring now to FIGURE 6 and 8, there is mounted between the side members 73 and 75 of the carriage 71 a bracket 140, whcih is secured to the side members 73 and 75 by suitable fastening bolts 143. A tubular member 142 extends through the mounting bracket 140 for supporting therein a tubular section 145 of the telescopic device 31, as best shown in FIGURES 2 and 3. Affixed to the operator's end of the tubular member 142 is an indicator disc 147, bearing suitable indicia for cooperation with suitable indicator members 148, 149 and 150 carried by the tubular section 145, so as to indicate the angular position of the tubular section 145 effected by the operator in angularly adjusting a handle portion 152 projecting therefrom.

*Telescopic device*

The specific construction of the telescopic device 31 is not a part of the present invention, and the device 31 may be of a type including a suitable lens mechanism (not shown), which may be readily adjusted by rotation of a knob 154 positioned at the end of the handle 152 and operatively connected through suitable means (not shown) to the lens mechanism in the tubular section 145 to adjust the focus of the telescopic device 31. The lens mechanism in the tubular section 145 includes an eye piece 156 at one end thereof having an opening 157 through which the operator may look into the lens mechanism. The opposite end of the tubular section 145 is provided with head portion 159, having an opening 160 therein, through which the eye of the patient is exposed to the lens mechanism within the tubular section 145 for viewing by the operator through the opening 157 in the eye piece 156.

The head portion 159 of the tubular section 145 may be angularly adjusted by the operator manipulating the handle 152, and is thereby angularly positioned in a box structure 162 carried by the tubular section 145 adjacent the tubular member 142. There is further provided an indicator device 164 projecting from an upper surface of the box structure 162. The indicator device 164 is provided with an indicator tape 166 operatively coupled by suitable means (not shown) to the adjustment knob 154 of the lens mechanism. The indicator tape 166 bears suitable indicia to indicate the radius of curvature of the cornea of the eye upon the telescopic device 31 being properly focused and adjusted, as will hereinafter be explained.

The box structure 162 is prevented from following the angular adjustment of the tubular section 145 by an antifriction roller 170 arranged in contacting relation with an outer side surface of the arcuate rail 68, as best shown in FIG. 1.

The roller 170 is rotatably mounted on a suitable bolt affixed by a nut 172, as shown in FIG. 3, to a flange 174 secured to an arm 175 which projects from one side of the box structure 162. Another arm 177 projects from the opposite side of the box structure 162. The roller 170 is so arranged in contacting relation with the outer side surface of the arcuate rail 68 as to permit angular movement of the tubular section 145 and head portion 159 in relation to the box structure 162.

An electrical conductor 180 leads through a conductor plug 182 to a suitable electric illuminating lamp (not shown) within the indicator 164 for illuminating the indicator tape 166, shown in FIG. 1.

A second electrical conductor 184 leads through a conductor plug 186, projecting from one side of the box structure 162 to a suitable electric illuminating lamp (not shown), which is arranged within the box structure 162 in cooperative relation with suitable reflecting means which may be of a conventional type so arranged as to direct light rays through a mire or illuminated image slot 188 provided in the head portion 159 and to one side of the opening 160.

A third electrical conductor 190 leads through a conductor plug 192, projecting from an opposite side of the box structure 162, to another suitable electric illuminating lamp (not shown) and arranged within the box structure 162 in cooperative relation with suitable reflecting means which may be of a conventional type so arranged as to direct light rays through a mire or illuminated image slot 194 provided in the head portion 159 and at a diametrically opposite side of the opening 160 from the mire slot 188. It will be seen that an angular adjustment of the tubular section 145 through manipulation of the handle 152 will effect a corresponding angular adjustment of the head portion 159 and thereby the mire slots 188 and 194. This adjustment will be indicated on the disc 147 by the cooperation of the indicator members 148, 149 or 150 with the indicia borne on the disc 147, while an angular adjustment of the tubular section 145, head portion 159 and thereby the mire slots 188 and 194 may also be effected by angular adjustment of the ring 41 in the arcuate ring support 39, as heretofore explained and indicated by pointers 57A, 57B and 57C in cooperation with indicia 58, as best shown by FIG. 1.

Arcuate adjustment of the carriage 71 and thereby the head portion 159 of the tubular section 145 borne by the carriage 71 may be further effected by the operator grasping the handles 175 and 177 and moving the carriage in the desired direction along the arcuate rails 68 and 69 to effect the selected degree of adjustment as indicated by the pointer 137 in cooperative relation with the indicia 139, on the outer surface of the arcuate rail 69, as shown by FIG. 2.

The mire slots

Figure 14:
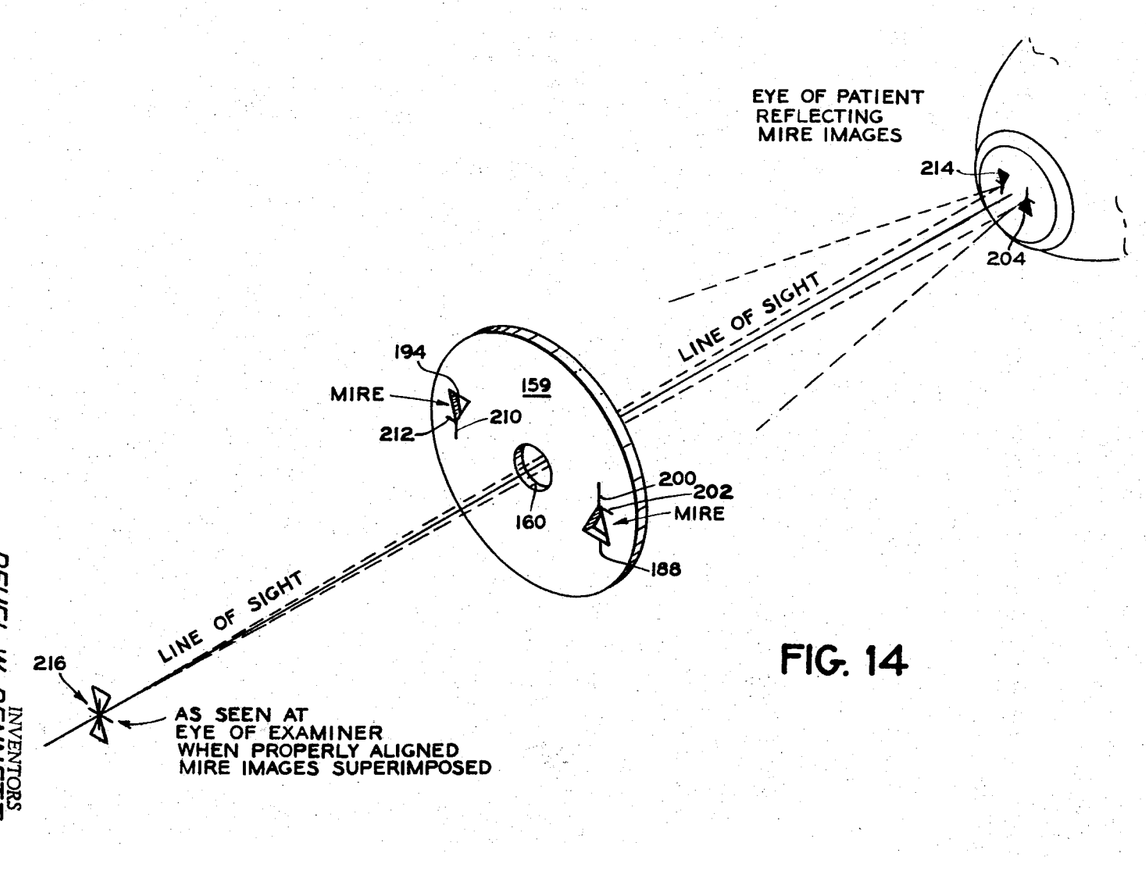
FIGURE 14 is a schematic view illustrating the mire or target system embodied in the present invention, and showing the eye of a patient reflecting the mire images and the appearance of the images to the eye of the operator upon the telescope of FIGURES 1, 2 and 3 being in a proper adjusted relation with the properly aligned mire images superimposed at the eye of the operator.

The mire slots 188 and 194 in the head portion 159 of the telescopic device 31, as shown schematically in FIG. 14, are in the form of a pair of triangular slots provided in the head portion 159 at opposite sides of the line of sight opening 160 provided therein. Further, one of the triangular slots, which is indicated by the numeral 188, has the base thereof in a relative position below the opening 160 while the other of the triangular slots, which is indicated by the numeral 194, has the base thereof in a relative position above the opening 160. The relationship of the mire slots 188 and 194 may be varied by the angular adjustment of the head position 159 of the telescopic device 31, as heretofore explained.

Further, as shown in FIG 14, there extends upwardly from the apex of the triangular mire slot 188 a mire line 200. A second mire line 202 extends at right angles to the mire line 200 and from the apex of the triangular mire slot 188 towards the periphery of the head portion 159. Light rays pass through the mire slot 188 and the mire lines 200 and 202 so as to form a minute image, which is reflected, as indicated at 204, from the cornea of the eye of the patient.

Similarly, there extends downwardly from the apex of the triangular mire slot 194 a mire line 210. A second mire line 212 extends at right angles to the mire line 210 and from the apex of the triangular mire slot 194 toward the periphery of the head portion 159. Light rays pass through the mire slot 194 and the mire lines 210 and 212 so as to form a minute image, which is reflected, at 214 as indicated from the cornea of the eye of the patient.

As heretofore explained, the box 162, which is best shown in FIGURE 3, carries therein suitable light means or source of illumination adapted to direct light rays through the mire slots 188 and 194 and the attendant mire lines 200 and 202 and 210 and 212, respectively, as best shown in FIGURE 14, onto the cornea of the eye of the patient as images 204 and 214 which are, in turn, reflected therefrom through the line of sight opening 160 and telescopic device 31 to the eye of the examiner.

In performing the measurements of the cornea of the eye of the patient the person making the measurements is positioned at the right of FIGURE 3 and diagrammatically at the left of FIGURE 14, so that upon the instrument being aligned with the eye of the patient, the person looking through the opening 157 in the eye piece into the telescopic device 31 and through the line of sight opening 160 is able to see the reflection of the images 204 and 214 of the mires on the eye of the patients, and, by a setting of the instrument, effect an in and out adjustment of the images to cause them to assume a desired relationship one to the other at the eye of the examiner, so that, when properly aligned, the images of the mires are superimposed one upon the other at the eye of the examiner, as indicated at 216 of FIGURE 14. The adjustment of the instrument to effect the proper alignment of the mires at each setting of the telescopic device 31 is indicated by suitable indicia on the instrument, as heretofore explained.

The arrangement of the triangular mire slots 188 and 194 with the attendant mire lines 200 and 202, and 210 and 212, respectively, permit the forming of the minute reflected triangular images 204 and 214 on the cornea of the eye, each of the triangular images having a length of less than one millimeter, while the base of each image may have a length for example of approximately .6 millimeter. Thus the images 204 and 214 may be of a size much smaller than that heretofore possible.

These minute reflected images or targets 204 and 214 are projected very near one to the other on to the surface of the cornea of the eye so that many more measurements may be taken over the surface of the cornea of the eye without overlapping than was heretofore possible. For example, the area being measured between the apex of each of the projected images 204 and 214, as shown diagrammatically in FIGURE 14, may be approximately .768 millimeter on an 8 millimeter radius with no overlapping, as shown diagrammatically by FIGURES 12 and 13.

Furthermore, because of the novel arrangement of the mire lines 200 and 202 in relation to the mire slot 188 and the mire lines 210 and 212 in relation to the mire slot 194, the proper alignment of the mires may be determined with greater accuracy upon the reflected minute images 204 and 214 being viewed in a superimposed relationship at the eye of the examiner, as indicated at 216 of FIGURE 14, with a line corresponding to the mire line 200 being in alignment with a line corresponding to the mire line 210 and a line corresponding to the mire line 202 being in alignment with a line corresponding to the mire line 212, while the apex of each of the minute triangular images are superimposed in coinciding relation one with the other as viewed at the eye of the examiner.

The size of the reflected image 204 and 214 is thus substantially reduced by the aforementioned arrangement of the mire system so that the small areas of the cornea of the eye may be charted with greater accuracy. The examiner of the eye is not only able through such arrangement to take spot measurement readings over the surface of the cornea, which is very important in the study of corneal topography, but the sensitivity and accuracy of such measurement readings has been substantially increased by the provision of the novel mire system of the present invention over that of the mire systems heretofore in use and the minute reflected images 204 and 214 made possible by the triangular mire system of present invention permit measurement readings further out on the periphery of the cornea of the eye with the attendant greater accuracy in the totality of the measurements effected thereby.

*Pedestal adjustment mechanism*

The pedestal 35 for the ophthalmometer 29 and telescopic device 31 carried thereby may be longitudinal adjusted backward and forward as well as laterally relative the eye of the patient by the operator-operative adjustment mechanism 37, as best shown in FIGURES 1, 2, 3 and 9.

Figure 9:
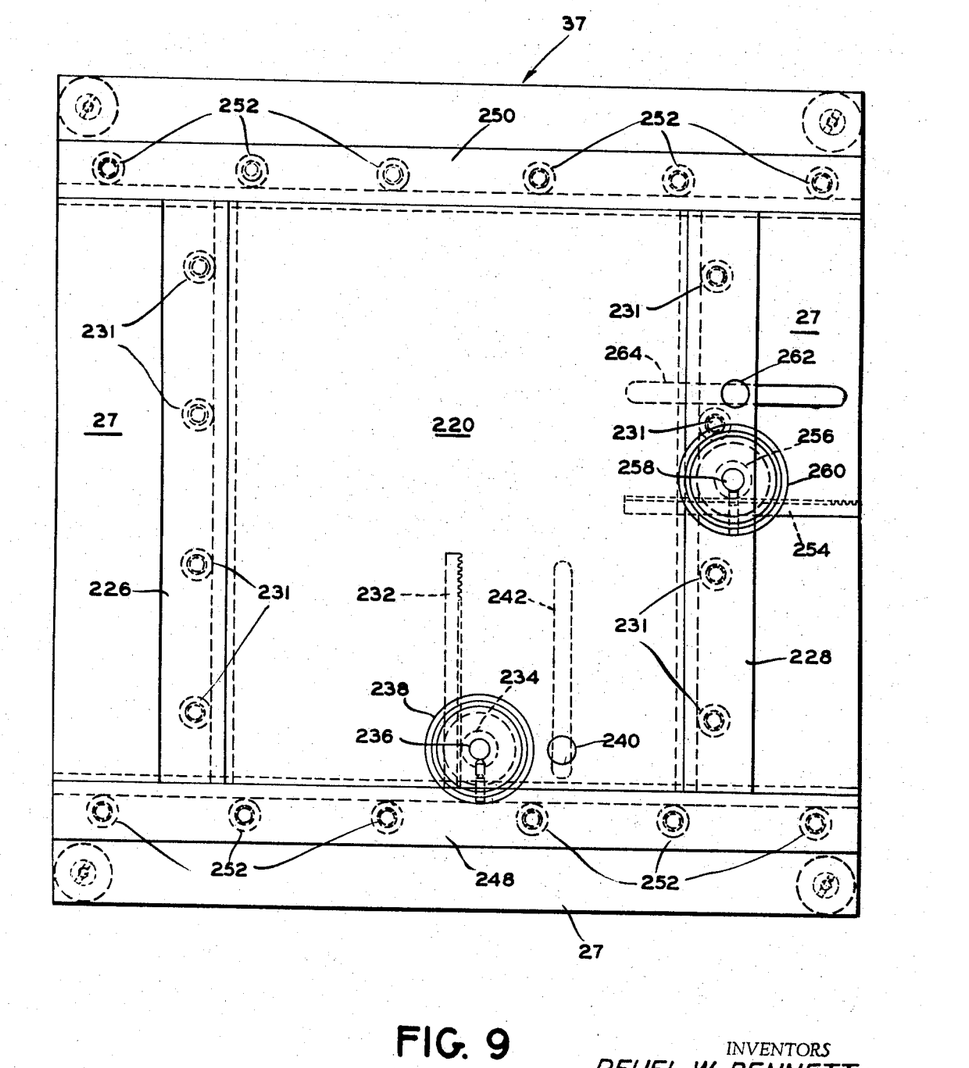
FIGURE 9 is an enlarged top plan view of the base of the ophthalmometer of FIGURES 1 and 2, and illustrating the mechanism whereby longitudinal and lateral adjustment of the ophthalmometer relative to the eye of the patient may be effected by convenient operator-operative adjustment knobs.

The adjustment mechanism 37 includes a plate 220 affixed directly to the pedestal 35 and slidably mounted at 222 and 224 in longitudinally extending tracks 226 and 228 affixed to a plate 230 by bolts 231, as shown in FIGURE 9. The tracks 226 and 228 are so arranged as to permit the backward and forward adjustment of the plate 220, pedestal 35 and telescopic device 31 carried thereby relative to the eye of the patient.

In order to effect the latter backward and forward adjustment of the plate 220, there is provided a rack 232 affixed to the plate 230 and extending longitudinally in parallel relation to the tracks 226 and 228. The rack 232 is arranged in toothed engagement with a pinion 234 carried by a shaft 236 rotatably mounted in the plate 220 and connected to an operator-operative adjustment knob 238.

The knob 238, upon rotation by the operator, is effective to cause the pinion 234 in toothed engagement with the rack 232 to slidably position the plate 220 longitudinally in the tracks 226 and 228 so as to effect the desired backward and forward adjustment of the pedestal 35 and telescopic device 31 relative to the eye of the patient. A pin 240 projects from the plate 220 into a longitudinal slot 242 formed in the plate 230 and arranged to limit the longitudinal adjustment of the plate 220 in the tracks 226 and 228 relative to the plate 230.

The plate 230 is slidably mounted at 244 and 246 in laterally extending tracks 248 and 250 affixed to the mounting plate 27 by bolts 252, as shown in FIGURE 9. The tracks 248 and 250 are so arranged as to permit the lateral adjustment of the plate 230, plate 220, pedestal 35 and telescopic device 31 carried thereby relative to the eye of the patient.

In order to effect the lateral adjustment of the plate 230, there is provided a rack 254 affixed to the mounting plate 27 and extending laterally in parallel relation to the tracks 248 and 250. The rack 254 is arranged in toothed engagement with a pinion 256 affixed to one end of a shaft 258 rotatably extending through the plate 230 and the track 228 carried by the plate 230. The shaft 258 is connected at the other end to an operator-operative adjustment knob 260.

The knob 260, upon rotation by the operator, is effective to cause the pinion 256 in toothed engagement with the rack 254 to slidably position the plate 230 laterally in the tracks 248 and 250 so as to effect the desired lateral adjustment of the pedestal 35 and telescopic device 31 relative to the eye of the patient. A pin 262 projects from the plate 230 into a lateral slot 264 formed in the mounting plate 27 and arranged to limit the lateral adjustment of the plate 230 in the tracks 248 and 250 relative to the mounting plate 27, which is, in turn, affixed to the table 20.

The operator by appropriate manipulation of the longitudinal and lateral adjustment knobs 238 and 260, respectively, may readily adjust the pedestal 35 and the ophthalmometer 29 carried thereby relative to the eye of the patient whose head is supported in the chin rest 25 affixed to the table 20 in spaced relation to the ophthalmometer 29, as shown in FIGURE 3.

*Modified pedestal adjustment mechanism*

In the modified form of the operator-operative adjustment mechanism 37A shown in FIGURES 10 and 11, corresponding parts to those heretofore described with reference to FIGURES 1 and 2 have been indicated by like numerals.

Moreover, in the modified form of the adjustment mechanism 37A, there is provided in addition a microadjustment lead screw 300 having a portion thereof screw threadedly engaged in a flange portion 301 projecting from the plate 230. The lead screw 300 has an operator-operative knob 302 secured at one end thereof while another portion of the lead screw 300 is screw threadedly engaged in a lead screw nut 304 carried at one end of a stub shaft 306 slidably mounted in a slot 308 provided in the plate 220. The stub shaft 306 has internal screw threads which are screw threadedly engage in external screw threads provided on an end portion of a stub shaft 310, which, in turn, is connected at an opposite end to an operator-operative knob 312.

When the knob 312 is rotated in one sense it serves to tighten the stub shaft 310 in screw threaded engagement in the stub shaft 306 so as to draw the lead screw nut 304 toward the knob 312 and lock the lead screw nut 304 in tight engagement with the plate 220. Thereafter, a turning of the microadjustment lead screw knob 302 may then effect a fine longitudinal adjustment of the plate 220 in the tracks 226 and 228 and relative to the plate 230 to thereby cause minute movements of the instrument 29 toward or away from the eye of the patient as may be desired to effect an extremely accurate setting thereof.

However, upon the microadjustment lock nut knob 312 being rotated in an opposite sense, the lead screw nut 304 is loosened from engagement with the plate 220 so that thereafter a turning of the knob 238 may effect a coarse longitudinal adjustment of the plate 220 in the tracks 226 and 228 and relative to the plate 230 to thereby cause the coarse adjustment of the instrument 29 toward and away from the eye of the patient.

In the modified arrangement upon the instrument 29 being adjusted to the approximate position desired in relation to the eye of the patient by the operator manipulating the coarse adjustment knob 238, the operator then adjusts the knob 312 so as to lock the lead screw nut 304 in tight engagement with the plate 220. Thereafter, the operator may then adjust the knob 302 and thereby the microadjustment lead screw 300 screw threadedly engaged in the nut 304 locked to the plate 220 so that the plate 220 and instrument 29 carried thereby may be adjusted backward or forward in relation to the eye of the patient to the precise position required.

Figure 10:
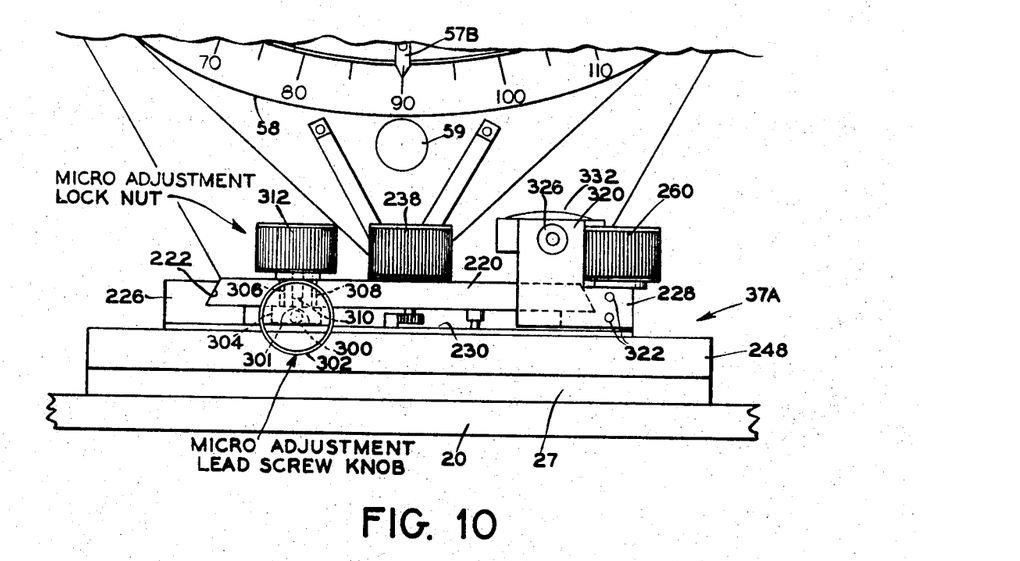
FIGURE 10 illustrates a modified form of the adjustable base mechanism of FIGURE 1, and shows a microadjustment lead screw mechanism with locking nut to effect a fine forward and backward adjustment of the instrument relative to the eye of the patient under examination.
Figure 11:
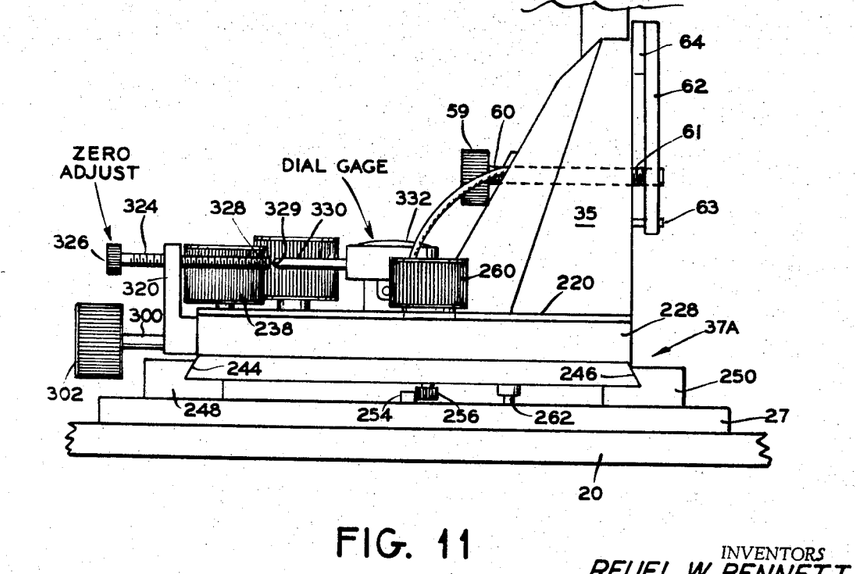
FIGURE 11 is a side view of the modified form of the adjustable base mechanism of FIGURE 10 and shows a zero adjustment screw and dial gage to provide an indication of the measure of the back and forth adjustment of the instrument relative to the zero adjustment screw.

Further, as shown in FIGURES 10 and 11, there is provided a bracket 320 affixed to an end of the track 228 by bolts 322 and having in screw threaded engagement in the bracket 320, a zero adjustment screw 324 having at one end an adjustment knob 326 and an opposite end 328 arranged for operative engagement with an end 329 of a push rod 330 for operating a suitable gage or indicator 332 carried by the plate 220 and which may be suitably calibrated so as to measure in millimeters the back and forth movement of the plate 220 in the tracks 226 and 228 relative to a zero point set by the adjusted position of the end portion 328 of the zero adjustment screw 324 arranged in contacting relation with the end portion 329 of the push rod 330 of the gage 332.

*Head support or chin rest*

The head support or chin rest 25 affixed by the mounting plate 22 to the table 20 in spaced relation to the ophthalmometer 29 of FIGURE 3, includes a supporting structure or chin rest 350 in which the patient may rest his chin during the examination or measurement of the topography of the cornea of his eye.

The chain rest 350 is supported between a pair of legs 352 and 354. The leg 354 is slidably mounted in a post 356, which projects from the mounting plate 22. The leg 352 is coupled to a second post 358 by a knurled microadjustment nut 360 which is screw threadedly engaged with end portions of the leg 352 and the post 358. Upon rotation of the nut 360 in one direction the chin rest 350 may be vertically raised. Upon rotation of the nut 360 in the opposite direction the chin rest 350 may be vertically lowered.

The eye of the patient to be examined is aligned with a marker 362 adjustably mounted on an upper portion of the leg 352. Extending across the upper ends of the legs 352 and 354 is a member 364 on which is pivotally mounted a shield 366 which may be positioned so as to occult that eye of the patient which is not under examination.

Moreover, while the telescopic device 31 may be aligned with the eye of the patient by the forward and backward positioning of the instrument through the operation of the knob 238 of FIGURE 1, and, the lateral positioning of the telescopic device 31 may be effected by the operation of the knob 260 of FIGURE 2, the vertical positioning of the eye of the patient in relation to the telescopic device 31 is accomplished by the vertical adjustment of the chin rest 350 by operation of the knurled microadjustment nut 360, as heretofore explained.

*Fixation light*

Positioned intermediate the patient at the head rest 25 and the ophthalmometer 29 is a fixation light 380, which may be an electric light bulb of small size carried by a stem 382 supported by a bracket 384 affixed to the pedestal 35 and including a small electric battery of a conventional type carried in a handle portion 386. A suitable switch operating knob 389 may be provided for closing and opening a curcuit from the battery to the fixation light 380 for selectively turning the light 380 on and off, as desired by the operator. The electrical conductors for energizing the small electric bulb 380 are carried within the stem 382 and out of sight of the patient.

In this connection, it should be borne in mind that the action of cyclophoria is quite capable of throwing off the axis of the astigmatism of the eye as the patient goes through the visual act of looking from a distance point to a near point. The fixation point provided by the small size electric light bulb 380 carried by the stem 382 is such as to cause the least amount of stimulance to the desire for accommodation. The small fixation light 380 is such that the patient cannot judge its distance and therefore the patient is less apt to exert the accommodating conversion efforts.

*Alignment test object*

There is shown in FIGURE 2 by dotted lines an alignment test object including a bar 400 which may be attached or removed from a suitable base. The bar 400 holds a magnetic attachment 402 supporting a steel ball 404. This attachment 402 is used by the examiner when aligning the instrument to his visual conditions prior to making any examination of the patient's eyes.

The test device is shown in dotted lines since it may be removed from or placed in an operative relation as the examiner may desire. Thus, the test device may be applied at any time the examiner may wish to confirm the fact that the instrument 29 is functioning properly and adjusted to give proper readings, as established by taking a reading of a ball 404 of known radius.

*Operation*

Figures 12, 13:
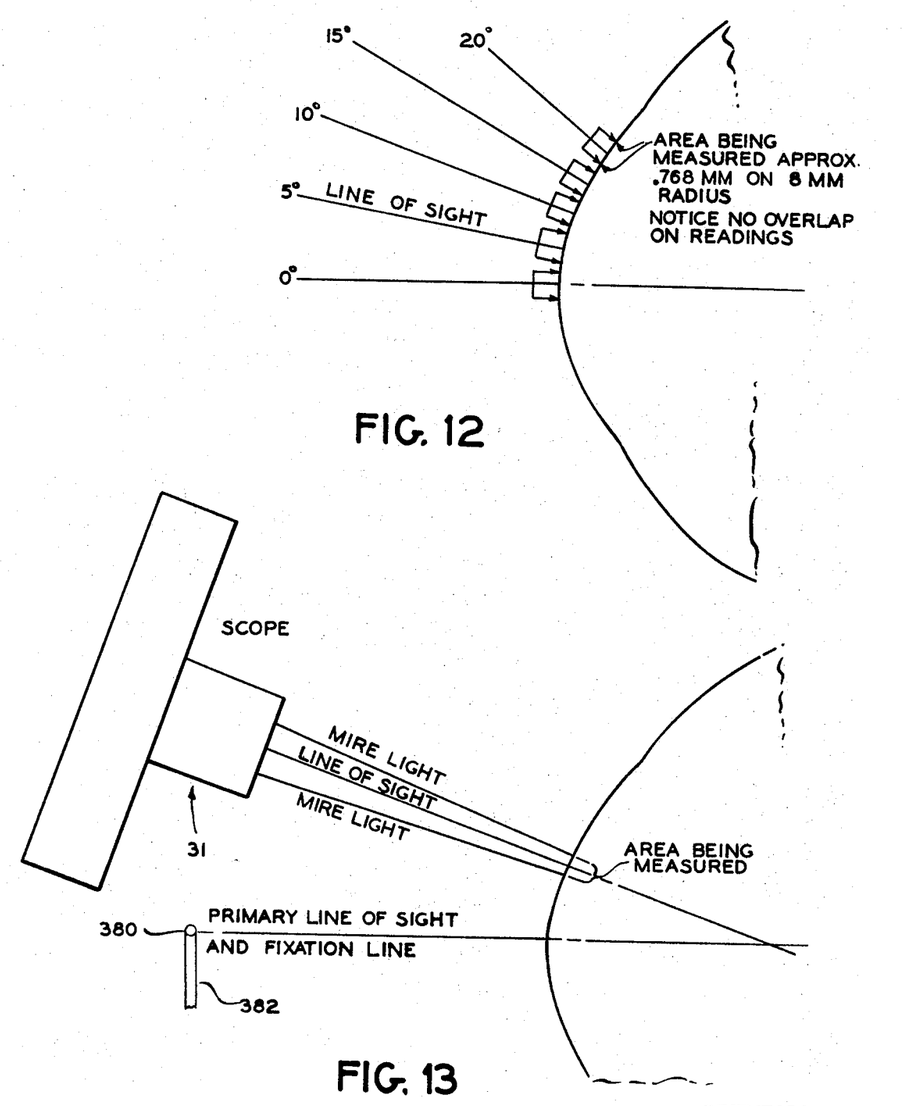
FIGURE 12 is an enlarged schematic view illustrating the operation of the present invention in the taking of measurements of the topography of the cornea of the eye of a patient at every five degrees or less without overlapping the area measured by the instrument.
FIGURE 13 is an enlarged schematic view illustrating the line of sight and the area of the cornea covered by the mire light of the telescope in the present invention.

In the operation of the ophthalmometer embodying the present invention, measurement readings can be taken by the operator at every five degree (5°) or less without overlapping the areas being measured as shown schematically by FIGURE 12. FIGURE 13 illustrates schematically the eye as fixed by the fixation light 380 and the area covered by the mire light. FIGURE 14 shows diagrammatically the minute triangular images 204 and 214 of the mires 188 and 194 as reflected on the cornea of the eye of the patient and how these reflected images appear at the eye of the examiner when the ophthalmometer 29 is in proper focus and adjustment and readied for recording the radius of curvature of the cornea of the eye.

In preparing the patient for such examination, the eye of the patient is held in a fixed position by the patient directing his eye along the line of sight fixed by the fixation light 380. The operator may then rotate the rotatable ring 41 in relation to the arcuate ring support 39 so that the pointers 57A, 57B and 57C designate degree markings 58 on the arcuate support 39 which correspond to the axis of astigmatism of the eye.

By rotating the ring 41 in the arcuate support 39, the operator may position the telescopic device 31 to any axis from zero to one hundred and eighty degrees (180°) known as the axis of astigmatism at which the instrument can be set.

It will be noted that in addition to the astigmatic dial 58 on the arcuate support 39 cooperating with pointers 57A, 57B and 57C carried by the ring 41, there is also provided a duplication of this astigmatic dial at 147 arranged in cooperative relation with the indicator members 148, 149 and 150 carried by the tubular section 145 of the telescopic device 31. The duplicate indicator dials 58 and 147 are so arranged in order that the operator may have at hand ready means for effecting an adjustment of the telescopic device 31 to any axis of the astigmatism as found by moving the ophthalmometer 29. Thus, the tubular section 145 of the telescopic device 31 may be angularly positioned in the mounting bracket 140 of FIGURES 6 and 8 to the proper axis, as indicated on the dial 147 of FIGURE 1. The axis located with the pointer 57B of ring 41 can be set to the proper axis indication on the indicia 58 on the arcuate support 39 by rotating the ring 41 to the proper position, placing the pointer 57B at the degree designation on indicia 58 corresponding to that previously located on the dial 147.

An alternate method of adjusting the ophthalmometer 29 to the proper axis is to leave the tubular section 145 set, as is shown in FIGURE 1, at the axis indication of ninety degrees and rotate the ring 41 to the alignment of the axis as shown by FIGURE 14, at which the apex of the reflected images 204 and 214 of the mires 188 and 194 will appear to coincide as at the eye of the examiner as indicated at 216. Now mires 188 and 194 are matched to the proper alignment of the axis of astigmatism of the eye.

Through the novel design of the triangular mire slots 188 and 194, not only may much smaller reflected images 204 and 214 be effected on the cornea of the eye, permitting greatly increased measurement readings, but these measurements may be effected with greater accuracy.

Moreover, one of the difficulties with the ophthalmometer instruments of the prior art has been the inability to adjust to a critical focus. There has always been a certain amount of disturbing parallax. The ophthalmometer instrument 29 of the present invention is so critical that the measurement readings cannot be taken unless the instrument is in proper focus. In the present invention, in addition to the adjustment of the lens mechanism by the knob 154, the entire instrument 29 is moved into critical focus by the adjustment of the operator-operative knob 238 of FIGURES 1 and 2 and the microadjustment knob 302 of FIGURES 10 and 11, to move the instrument 29 forward and backward relative to the eye of the patient to the precise critical focus, while the operator-operative knob 260 moves the instrument 29 laterally in relation to the eye.

Furthermore, in the present invention, the telescopic device 31 may be manually adjusted by the operator so as to follow the axis of the astigmatism of the eye at any point away from the primary line of sight, which may be done by the operator moving the carriage 71 of the telescopic device 31 on the arcuate tracks or rails 68 and 69 to any degree mark, as indicated by the pointer 137 arranged in cooperation with the indicia 139, as best shown in FIGURE 2, and the markings of which are shown in five degree (5°) steps. The carriage 71 is held in the adjusted position at the selected degree marking by the spring loaded balls 116 and 116A, which drop into the detents 120 positioned opposite the degree markings.

The alignment of the telescopic device 31 at the primary line of sight to the axis of astigmatism of the eye may be effected, as heretofore noted, by angular adjustment of the tubular member 145. While critical alignment of the telescopic device 31 to the axis of astigmatism of the eye in any secondary position or line or degree away from the primary line of sight may be effected by the angular adjustment of the ring 41 in relation to the arcuate ring support 39 to an indicated degree marking corresponding to the axis of astigmatism of the eye.

This affords the examiner with ready means for effecting critical alignment of the instrument to the axis of astigmatism of the eye in the primary position of the carriage 71 on the arcuate rails 68 and 69 as well as to the axis of astigmatism of the eye in any secondary position or line or degree away from the primary line of sight.

The readings of the radius of curvature are shown on the indicator tape 166 of the indicator device 164 shown in FIGURE 1. These readings vary as to the radius of curvature of the cornea and to the primary and secondary axis of the astigmatism of the eye and as to the flattening or steepening changes away from the primary line of sight.

The mire slots 188 and 194 are illuminated and reflected on the cornea of the eye as the images 204 and 214, and, when the telescopic device 31 is properly focused and adjusted to the radius of curvature of the cornea of the eye, these minute triangular images appear to the eye of the examiner as superimposed with the apex of the one coinciding with the apex of the other, as indicated at 216 of FIGURE 14, at which time the reading on the tape 166 of FIGURE 1 may be recorded. The instrument may be calibrated to read radius of curvature in tenths of a millimeter from for example five and one half millimeters (5½ mm.) to eleven millimeters (11 mm.) radius. The tape 166 of FIGURE 1 indicates a reading of eight millimeters (8 mm.) as this was the millimeter radius shown for example in FIGURE 12, which was the result of the alignment at 216 of the reflected triangular images 204 and 214 of the mire slots 188 and 194, as shown by FIGURE 14.

Although two embodiments of the invention have been illustrated and described, various changes in the form and relative arrangements of the parts, which will now appear to those skilled in the art may be made without departing from the scope of the invention. Reference is, therefore, to be had to the appended claims for a definition of the limits of the invention.

What we claim is:

1. An instrument for measuring curvature of a cornea of an eye of a person, said instrument comprising in combination a telescope device having an optical axis, mires carried by the device, light source means arranged in relation to the mires for projecting images of the mires on to the cornea of the eye of the person, means to operatively align the optical axis of the telescope device with the eye of the person, an arcuate track, a carriage for the telescope device, means to movably mount the carriage on the arcuate track, first operator-operative means for movably positioning the carriage on the arcuate track to thereby arcuately position the telescope device and the mires carried thereby in relation to the eye of the person, a ring for carrying the arcuate track, a pedestal including an arcuate member for supporting the ring, and a second operator-operative means for rotatably positioning the ring in the arcuate supporting member so as to thereby angularly adjust the arcuate track and carriage, telescope device and mires in relation to the eye of the person with the optical axis of the telescope device being aligned with the eye of the patient at such adjusted positions.

2. The combination defined by claim 7 including a stem member supported by the pedestal and having a free end, a fixation light positioned at the free end of the stem member and in a primary line of sight of the eye of the person so that the eye may be maintained in a fixed position while the telescope device may be arcuately and angularly positioned in relation to the eye of the person by the first and second operator-operative means in the measuring of the curvature of the cornea of the eye of the person.

3. The combination defined by claim 1 including a first indicator means on the carriage, a second indicator means on the arcuate track and arranged in cooperative relation with the first indicator means so as to indicate the adjusted arcuate position of the optical observing device and mires in relation to the eye of the person, a third indicator means on the ring, a fourth indicator means on the arcuate supporting member and arranged in cooperative relation with the third indicator means so as to indicate the adjusted angular position of the telescope device and mires in relation to the eye of the person.

4. The combination defined by claim 1 including means for releasably locking the carriage in an adjusted arcuate position on the track and thereby the adjusted arcuate position of the optical observing device in relation to the eye of the person, and other means for releasably locking the ring in an adjusted position in the arcuate supporting member and thereby the adjusted angular position of the telescope device in relation to the eye of the person.

5. An instrument for measuring the curvature of a cornea of an eye of a person, said instrument comprising in combination a telescope device having an optical axis, mires carried by the device, light source means so arranged in relation to the mires as to project images of the mires onto the cornea of the eye of the person, an arcuate track, a pedestal including means for supporting the arcuate track, a carriage for the telescope device, said carriage including a tubular member supporting the telescope device therein for angular adjustment, first operator-operative means to angularly position the telescope device in the tubular member so as to thereby angularly adjust the mires in relation to the eyes of the person, means to movably mount the carriage on the arcuate track, second operator-operative means for movably positioning the carriage on the arcuate track to thereby arcuately position the telescope device and the mires carried thereby in relation to the eye of the person with the optical axis of the telescope device being aligned with the eye of the person at such positions of the telescope device.

6. The combination defined by claim 5, including a stem member supported by the pedestal and having a free end, a fixation light positioned at the free end of the stem member and in a primary line of sight of the eye of the person so that the eye may be maintained in a fixed position while the telescope device may be angularly and arcuately positioned in relation to the eye of the person by the first and second operator-operative means in the measuring of the curvature of the cornea of the eye of the person.

7. The combination defined by claim 5 including first indicator means on the carriage, second indicator means on the arcuate track and arranged in cooperative relation with the first indicator means so as to indicate the adjusted arcuate position of the telescope device and mires in relation to the eye of the person, third indicator means carried by the tubular supporting member, and fourth indicator means carried by the optical observing device and arranged in cooperative relation with the third indicator means so as to indicate an adjusted angular position of the telescope device and mires the relation to the eye of the person.

8. In an instrument for measuring curvature of a cornea of an eye of a patient, the combination comprising a head rest for the patient, a pedestal positioned in spaced relation to the head rest, an arcuate track, said pedestal including means for supporting the track in arcuate relation to the head rest, a carriage, means to movably mount the carriage on the arcuate track, a telescope device having an optical axis, means to mount the device in the carriage, mires carried by the device, light source means for projecting images of the mires onto the cornea of the eye of the patient, operator-operative means for movably positioning the carriage on the arcuate track to thereby arcuately adjust the telescope device and the mires carried thereby in relation to the eye of the patient, a stem member supported by the pedestal and having a free end positioned intermediate the head rest and the arcuate track, a fixation light mounted at the free end of the stem member and in a primary line of sight of the eye of the patient so that the eye may be maintained in a fixed position while the telescope device and the mires carried thereby may be adjustably positioned in relation to the eye to effectively measure the curvature of the cornea of the eye of the patient supported by the head rest with the optical axis of the telescope device being aligned with the eye of the patient in such positions of the telescope device.

9. The combination defined by claim 8 in which the track supporting means includes a ring for carrying the arcuate track, and other operator-operative means for rotatably positioning the ring in relation to the pedestal to thereby angularly adjust the telescope device and the mires carried thereby in relation to the eye of the patient to effectively measure the curvature of the cornea thereof.

10. The combination defined by claim 8 in which the means to mount the telescope device in the carriage includes a tubular member supporting the telescope device therein for angular adjustment, and other operator-operative means to angularly position the telescope device in the tubular member to thereby angularly adjust the telescope device and the mires carried thereby in relation to the eye of the patient to effectively measure the curvature of the cornea thereof.

11. The combination defined by claim 8 including means to adjustably position the pedestal laterally and longitudinally in relation to the head rest to effect a critical focus of the telescope device on the cornea of the eye of the patient supported by the head rest.

12. The combination defined by claim 8 including a first supporting plate affixed to a lower end of the pedestal, a second supporting plate carrying first tracks, the first plate being slidably positioned in the first tracks, a base plate rigidly connected to said head rest, said base plate carrying second tracks extending perpendicular to the first tracks, the second plate being slidably positioned in the second tracks, a first rack mounted on the second supporting plate and extending in parallel relation to the first tracks, a first operator-operative knob means rotatably mounted in the first supporting plate and having a pinion operatively engaging the first rack for slidably positioning the first plate in the first tracks, a second rack mounted on the base plate and extending in parallel relation to the second tracks, a second operator-operative knob means rotatably mounted in the second supporting plate and having a pinion operatively engaging the second rack for slidably positioning the second plate in the second tracks extending in perpendicular relation to the first tracks, one of said supporting plates being adjustably positioned laterally in relation to the head rest by the corresponding operator-operative knob means, the other of said supportive plates being adjustably positioned longitudinally in relation to the head rest by the corresponding other operator-operative knob means, and the supporting plates being thereby adjustably positioned for effecting an adjustment of the pedestal relative to the head rest and thereby a critical focus of the telescope device on the cornea of the eye of the patient supported by the head rest.

13. The combination defined by claim 12 including an operator-operative micro-screw adjustment means, and other operator-operative means to releasably connect said micro-screw adjustment means in an operative relation with the other of said supporting plates for effecting a fine adjustment of the longitudinal position of the other supporting plate and pedestal in relation to the head rest and thereby the critical focus of the telescope device.

14. An instrument for measuring curvature of a cornea of an eye of a patient, said instrument comprising, in combination, a head rest for the patient, a pedestal positioned in spaced relation to the head rest, an arcuate track, a ring for carrying the arcuate track, said pedestal including an arcuate member for supporting the ring, an ophthalmometer optical observing device, said device including mires carried by the device, light source means so arranged in relation to the mires as to project images of the mires onto the cornea of the eye of the patient, and a telescope having an optical axis, said telescope being operatively adjustable to superimpose at an eye of an operator reflected images of the mires from the cornea of the eye of the patient, a carriage for the optical observing device, means to movably mount the carriage on the arcuate track, said carriage including a tubular member supporting the optical observing device therein for angular adjustment, first operator-operative means for movably positioning the carriage on the arcuate track to thereby arcuately position the telescope and the mires carried by the aforesaid device in relation to the eye of the patient, a second operator-operative means for rotatably positioning the ring in the arcuate supporting member so as to thereby angularly adjust the arcuate track, carriage, telescope and mires in relation to the eye of the patient, means for releasably locking the carriage in an adjusted arcuate position on the track and thereby the adjusted arcuate position of the telescope in the aligned relation to the eye of the patient, other means for releasably locking the ring in an adjusted position in the arcuate supporting member and thereby the adjusted angular position of the telescope in the aligned relation to the eye of the patient, third operator-operative means to angularly position the telescope in the tubular member so as to thereby angularly adjust the mires in relation to the eye of the patient, first indicator means on the carriage, second indicator means on the arcuate track and arranged in cooperative relation with the first indicator means so as to indicate the adjusted arcuate position of the telescope and mires, a third indicator means on the ring, a fourth indicator means on the arcuate supporting member and arranged in cooperative relation with the third indicator means so as to indicate the adjusted angular position of the arcuate track, carriage, telescope and mires, a fifth indicator means carried by the tubular supporting member, a sixth indicator means carried by the telescope and arranged in cooperative relation with the fifth indicator means so to indicate an adjusted angular position of the telescope and mires carried by the aforesaid device, a stem member supported by the pedestal and having a free end positioned intermediate the head rest and the arcuate track, a fixation light mounted at the free end of the stem member and in a primary line of sight of the eye of the patient so that the eye may be maintained in a fixed position while the telescope of the optical observing device and the mires carried thereby may be adjustably positioned to effectively measure the curvature of the cornea of the eye of the patient supported by the head rest, and other operator-operative means to adjustably position the pedestal relative to the head rest to effect a critical focus of the optical observing device on the cornea of the eye of the patient supported by the head rest.

15. A method of measuring curvature of a cornea of an eye of a patient; comprising the steps of directing the eye of the patient at a point of fixation and along a primary line of sight, maintaining the eye of the patient in this primary position, placing an ophthalmometer in an operative position in front of the eye, projecting a pair of minute triangular mire images each having a base and a length of less than one millimeter onto a surface of the cornea of the eye with the apex of one of said pair of triangular mire images spaced from the apex of the other of said pair of mire images by less than one millimeter, reflecting said pair of mire images from the cornea of the eye and through a telescope of the ophthalmometer to an eye of an operator, and focusing the telescope so as to coincide the apex of one of the reflected triangular mire images with the apex of the other of said reflected triangular mire images at the eye of the operator upon the ophthalmometer being operatively adjusted to measure the curvature at said surface of the cornea of the eye of the patient.

16. The method defined by claim 15 including the additional steps of placing an optical axis of the telescope of the ophthalmometer in alignment with the eyes of the patient and at different arcuate positions in front of the eye of the patient, projecting pairs of said minute triangular mire images onto different surfaces of the cornea of the eye of the patient, and making the measurements of the curvature at said different surfaces of the cornea of the eye of the patient with the ophthalmometer at different arcuate positions.

17. In an instrument for measuring curvature of a cornea of an eye of a patient, the combination comprising fixation means for maintaining the eye of the patient in a primary position, an ophthalmometer including a telescope operatively positioned in front of the eye of the patient, the ophthalmometer including means for projecting a pair of minute triangular mire images onto a surface of the cornea of the eye, said images each having a base and a length of less than one millimeter, the apex of one of said mire images being spaced from the apex of the other of said pair of mire images by less than one millimeter, the pair of mire images being reflected from said surface of the cornea of the eye and through the telescope of the ophthalmometer for superimposing the reflected mire images at an eye of an operator, and the telescope of the ophthalmometer including operatively adjustable focusing means to cause the apex of one of the superimposed reflected triangular images to coincide with the apex of the other of said superimposed reflected triangular mire images at the eye of the operator upon the telescope of the ophthalmometer being operatively adjusted to measure the curvature at said surface of the cornea of the eye of the patient.

18. The combination defined by claim 17 including the telescope having an optical axis, means for operatively positioning the optical axis of the ophthalmometer at different arcuate positions in alignment with and in front of the eye of the patient so that measurements may be made of the curvature at different surfaces of the cornea of the eye of the patient upon the optical axis of the telescope of the ophthalmometer being operatively positioned at said different arcuate positions.

References Cited

UNITED STATES PATENTS

| | | | |
|---|---|---|---|
| 679,890 | 8/1901 | Ferguson | 351—6 X |
| 1,134,610 | 4/1915 | Hartmann | 33—69 X |
| 1,721,208 | 7/1929 | Currier et al. | 351—23 |
| 1,918,540 | 7/1933 | Hartinger | 351—13 |
| 2,012,758 | 8/1935 | Fincham | 351—6 |
| 2,482,669 | 9/1949 | Harding | 351—23 |
| 3,201,795 | 8/1965 | Cüppers et al. | 351—38 |

FOREIGN PATENTS

| | | |
|---|---|---|
| 61,626 | 5/1891 | Germany. |
| 625,160 | 8/1961 | Canada. |

DAVID SCHONBERG, *Primary Examiner.*

P. R. GILLIAM, *Assistant Examiner.*